(12) United States Patent
Gaudig

(10) Patent No.: US 9,919,654 B2
(45) Date of Patent: Mar. 20, 2018

(54) STORAGE COMPARTMENT FOR A VEHICLE AND VEHICLE WITH A STORAGE COMPARTMENT

(71) Applicant: GM GLOBAL TECHNOLOGY OPERATIONS LLC, Detroit, MI (US)

(72) Inventor: Ralf Gaudig, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 14/957,696

(22) Filed: Dec. 3, 2015

(65) Prior Publication Data

US 2016/0159289 A1 Jun. 9, 2016

(30) Foreign Application Priority Data

Dec. 3, 2014 (DE) .................... 20 2014 009 636 U

(51) Int. Cl.
*B60R 7/04* (2006.01)
*E05B 83/32* (2014.01)

(52) U.S. Cl.
CPC ............... *B60R 7/04* (2013.01); *E05B 83/32* (2013.01)

(58) Field of Classification Search
CPC .............. B60R 7/04; B60R 7/06; E05B 83/32
USPC .................... 296/37.8, 37.14, 24.34
See application file for complete search history.

(56) References Cited

U.S. PATENT DOCUMENTS

| 5,173,992 | A | * | 12/1992 | Aihara | ...................... B60R 7/04 16/232 |
| 5,210,906 | A | | 5/1993 | Aihara et al. | |
| 5,212,849 | A | * | 5/1993 | Aihara | .................. E05D 7/1061 16/232 |
| 6,733,096 | B2 | * | 5/2004 | Bae | ...................... B60N 2/4686 16/230 |
| 7,089,627 | B2 | * | 8/2006 | Seidler | .................. B65D 51/04 16/320 |
| 7,467,440 | B2 | * | 12/2008 | Seidler | .................. B65D 51/04 16/320 |
| 7,686,364 | B2 | * | 3/2010 | Hehn | ....................... B60R 7/04 220/812 |
| 8,517,792 | B1 | * | 8/2013 | Foster | ................ A01M 31/004 446/418 |

(Continued)

FOREIGN PATENT DOCUMENTS

DE 4302868 A1 8/1994
DE 102004041617 B3 2/2006
(Continued)

OTHER PUBLICATIONS

German Patent Office, German Search Report for German Application No. 202014009636.8, dated Jul. 29, 2015.

*Primary Examiner* — Hilary L Gutman
(74) *Attorney, Agent, or Firm* — Lorenz & Kopf LLP

(57) ABSTRACT

A storage compartment for a vehicle includes a housing structure and a cover pivotably coupled on the housing structure. The cover is pivotably positionable from a first position completely closing a compartment of the housing structure into a second position partially revealing the compartment and into a third position completely revealing the compartment. The storage compartment further includes at least one structure-side magnet and at least one cover-side damping magnet arranged in a mutually repelling manner in the first and second position of the cover.

13 Claims, 6 Drawing Sheets

(56) References Cited

U.S. PATENT DOCUMENTS 8,839,561 B2 * 9/2014 Yagi ..................... E05D 1/06
16/320
9,302,628 B2 * 4/2016 Smith
9,676,340 B2 * 6/2017 Ankolikar ............. E05D 15/502

FOREIGN PATENT DOCUMENTS

DE   102013014155 A1   4/2014
FR       2896741 A1   8/2007

* cited by examiner

STORAGE COMPARTMENT FOR A VEHICLE AND VEHICLE WITH A STORAGE COMPARTMENT

CROSS-REFERENCE TO RELATED APPLICATION

This application claims priority to German Patent Application No. 202014009636.8, filed Dec. 3, 2014, which is incorporated herein by reference in its entirety.

TECHNICAL FIELD

The present disclosure pertains to a storage compartment for a vehicle and more particularly to a housing structure and a cover arrangement having a set of mutually repelling magnets.

BACKGROUND

In almost every vehicle at least one storage compartment is provided in which an occupant of the vehicle can stow objects. Many of these storage compartments include a receiving housing and a cover for the receiving housing, which can be transferred from a closed position into an open position and back. It is known to provide magnets in operative communication on the housing and the cover in order to hold the cover magnetically closed in the closed position and in order to hold the cover magnetically open in the open position. For this purpose the magnets are arranged in the closed position so that they mutually attract and are arranged in the open position so that they mutually repel.

For example, DE 10 2013 014 155 A1 describes a container with a storage compartment and a non-hinged cover for closing the storage compartment. The container includes at least one pair of magnets of which one magnet is disposed on the storage compartment and the other magnet is disposed on the non-hinged cover. In the closed state of the container, the magnetic poles attract one another whereas in the open state of the container, they repel one another.

SUMMARY

A storage compartment for a vehicle, in particular an automobile or truck, is proposed. For example, the storage compartment can be integrated in an internal fitting of the vehicle, for example, in a central console. It is also possible within the framework of the present disclosure that the storage compartment can be integrated in a dashboard, instrument panel, and/or vehicle door, wall and/or floor cladding.

The storage compartment includes a housing structure and a cover pivotally mounted about at least one pivot axis. Preferably the housing structure forms at least one receiving container in which objects can be deposit and store. Preferably the cover is configured for opening and closing the housing structure. For example, the housing structure and/or the cover include a rigid plastic material as base material.

It is possible within the framework of the present disclosure that the at least one pivot axis includes a first pivot axis and a second pivot axis. Preferably the first and second pivot axes run along two opposite side surfaces of the housing structure so that the cover is configured to be opened and closed in two directions. This is advantageous for example when integrating the storage compartment into the central console since the cover is pivotable from a left side of the vehicle about the first pivot axis in the direction of a right-hand seat and is pivotable from a right side about the second pivot axis in the direction of a left-hand seat.

Preferably the storage compartment has a locking device by means of which the cover is locked in the first position and held closed in the housing structure. The locking device includes, for example, at least one cover-side latching element, which engages positively or latches into at least one structure-side counter-latching element to lock the cover in the first position. Preferably the locking device is to be actuated manually by the passenger in order to transfer the cover from the first position into a second and/or third position.

The cover can be transferred from a first position into a second position and from the second position into a third position. Preferably the cover can be transferred transitionlessly from the first position into the second position by handling of the passenger. In the first position the cover completely closes the housing structure.

In the second position the cover partially reveals the housing structure. For example, in the second position of the cover, the housing structure is at least 5%, in particular at least 8%, especially at least 11%, at most 20%, and preferably at most 15% open. For example, the housing structure is open ajar in the second position of the cover. In particular, in the second position the cover is pivoted by at least 5 degrees and/or by at most 20 degrees, preferably by at most 15 degrees, in particular by at most 10 degrees with respect to the first position.

In the third position, the cover completely reveals the housing structure. Preferably the housing structure is at least 70%, preferably at least 80% and especially at least 90% revealed. In particular, the cover in the third position is pivoted by at least 75 degrees, especially by at least 85 degrees and/or pivoted by at most 130 degrees with respect to the first position. For example, in the third position the passenger of the vehicle can reach into the housing structure, place objects therein or remove them therefrom.

The housing structure includes at least one structure-side magnet. For example, the at least one structure-side magnet is disposed on the housing structure, in particular fastened thereto. Preferably the at least one structure-side magnet is connected seamlessly to the housing structure, in particular adhesively bonded thereto, welded or integrated in the base material thereof, especially primarily formed with this. For example, the at least one structure-side magnet is disposed on one of the two front sides of the housing structure. This has the advantage that the at least one structure-side magnet can be integrated non-visibly.

Preferably the at least one structure-side magnet is configured as a first and second structure-side magnet. Preferably the first and second structure-side magnets are disposed on a first front side of the two front sides of the housing structure. For example, the first and second structure-side magnet are disposed in the region of the at least one pivot axis and/or in the fastening region of the cover on the housing structure. In the case where the housing structure is to be opened on both sides and includes the first and second pivot axis, it is preferable that the first structure-side magnet is disposed in the region of the second pivot axis.

The cover has at least one cover-side damping magnet. Preferably the at least one cover-side damping magnet is pivotable with the cover. In particular, the at least one cover-side damping magnet is disposed on the cover, preferably fastened seamlessly to the cover. For example, the at least one cover-side damping magnet is adhesively bonded to the cover and/or integrated in the base material thereof, in particular reformed with this. This has the advantage that the at least one cover-side damping magnet can be integrated non-visibly.

Particularly preferably the at least one structure-side magnet and the at least one cover-side damping magnet are configured as at least one so-called neodymium magnet. Neodymium magnets include an alloy of neodymium, iron and boron and form extremely strong permanent magnets.

In the first position and in the second position of the cover, the at least one structure-side magnet and the at least one cover-side damping magnet are arranged to be mutually repelling. In particular, negative poles or positive poles of both magnets are directed to one another so that repulsion force is achieved therebetween.

It is advantageous that as a result of the repulsive arrangement of the at least one structure-side magnet and the at least one cover-side damping magnet in the first position of the cover, a play-free mounting of the cover locked by the locking device can be achieved. As a result, vibrations produced during travel of the vehicle and rattling noise of the cover thereby produced can be avoided. In particular, the repelling arrangement of the at least one structure-side magnet and the at least one cover-side damping magnet assists a noise-free positive locking of the cover. Furthermore, the repelling arrangement assists the release of the positive locking of the cover and the housing structure to open the cover.

It is furthermore advantageous that in the second position, as a result of the repelling arrangement of the at least one structure-side magnet and the at least one cover-side damping magnet, the cover is held partially open, in particular ajar and does not unintentionally shut. Furthermore, during the transfer from the third position into the first position, the cover is initially paused in the second position. As a result, a closing process of the cover from the third or second position into the first position is damped. A jerky closure of the cover is avoided.

The aforesaid magnets are cost-effective, largely noise-free, robust and/or long-lived components, which also have the advantage of a lower wear with long lifetime. They are additionally easy to mount or easy to integrate into the base material. As a result, costs can advantageously be saved during the manufacture and maintenance of the storage compartment.

Preferably all the aforesaid and undermentioned magnets of the storage compartment have magnetic forces, which extend along a straight line, which runs in the longitudinal extension from a south pole to a north pole.

In a preferred embodiment of the present disclosure, the at least one structure-side magnet, in particular in a sectional view whose line of intersection runs perpendicularly to the at least one pivot axis, is disposed at the height of the at least one pivot axis and/or adjacent thereto. In particular, the at least one structure-side magnet is disposed directly adjacent to the pivot axis. It is particularly preferred that magnetic forces of the structure-side magnet are aligned perpendicularly or substantially perpendicularly to the at least one pivot axis, in particular vertically. The magnetic forces are in particular aligned independently of the position of the cover.

In a preferred implementation of the present disclosure, the at least one cover-side damping magnet in the first position and in the second position of the cover is disposed above the at least one structure-side magnet. Preferably the at least one cover-side damping magnet in the first position and in the second position of the cover in a plan view from above is arranged overlapping with the at least one structure-side magnet. Preferably the aforesaid magnets in the first position of the cover overlap completely and in the second position of the cover partially or for the most part, in particular at least 50%. In particular the at least one cover-side damping magnet and the at least one structure-side magnet in the first and second position of the cover are arranged so that they are in mutual operative communication. As a result, the repelling arrangement can be implemented in the first and second position of the cover.

It is preferable that magnetic forces of the at least one cover-side damping magnet in the first position of the cover are aligned in the opposite direction to the magnetic forces of the at least one structure-side magnet. In this case, the magnetic forces of the at least one cover-side damping magnet are preferably aligned perpendicular or substantially perpendicular, in particular vertically.

Particularly preferably the magnetic forces of the at least one cover-side damping magnet in the second position of the cover are aligned at an angle to the magnetic forces of the at least one structure-side magnet, wherein the angle corresponds to the angle at which the cover is pivoted. These angles are sufficiently small so that it can be achieved that the magnetic forces of the at least one cover-side damping magnet and the at least one structure-side magnet in the first and second position of the cover are aligned so that they are in mutual operative communication. In particular, the repelling arrangement between the aforesaid magnets can be implemented in the first and second position of the cover.

In a particularly preferred embodiment of the present disclosure, in a plan view from above, the at least one cover-side damping magnet in the third position of the cover is arranged free from overlap to the at least one structure-side magnet. In particular the at least one cover-side damping magnet in the third position of the cover is arranged free from operative communication to the at least one structure-side magnet. Preferably the magnetic forces of the at least one cover-side damping magnet in the third position of the cover are aligned horizontally or substantially horizontally to the magnetic forces of the at least one structure-side magnet. It is thereby achieved that the at least one structure-side magnet and the at least one cover-side damping magnet in the third position neither repel nor attract.

The change in the alignment of the magnetic forces from oppositely directed, perpendicular, in particular vertical in the first position to horizontal in the third position of the cover of the at least one cover-side damping magnet is achieved in particular by the pivoting of the cover during transfer from the first into the third position. In particular, the alignment of the magnetic forces of the at least one cover-side damping magnet is dependent on the pivoting and the position of the cover. As a result of the pivoting of the cover, the at least one cover-side damping magnet is pivoted out from the arrangement with the at least one structure-side magnet overlapping from above and in the third position of the cover in plan view from above, is arranged free from overlap, in particular at a distance and/or offset from the at least one structure-side magnet.

In one possible constructive implementation of the present disclosure, the cover includes first and second cover front sides with at least one edge region. Preferably the at least one edge region is facing the at least one pivot axis. Preferably the at least one edge region with the cover is pivotable about the pivot axis and optionally additionally about the adjacently disposed at least one structure-side magnet and is guided around this. In particular, the at least one edge region is pivoted about the at least one pivot axis and optionally additionally about the at least one structure-side magnet when the cover is transferred from the first or from the second position into the third position. For this purpose, in the sectional view whose line of intersection runs perpendicularly to the at least one pivot axis, the at least one edge region is configured to be, for example, arcuate and/or sickle-shaped. As a result, the at least one edge region can embrace the at least one pivot axis and optionally additionally the at least one structure-side magnet in the third position of the cover partially and preferably from below in an arcuate and/or sickle shape.

In the event that the cover is pivotable to both sides and/or is pivotable about the first and second pivot axis, the cover has a first edge region, which is pivotable about the first pivot axis and optionally additionally about the first structure-side magnet. In addition, the cover has a second edge region, which is pivotable about the second pivot axis and optionally additionally about the second structure-side magnet.

In a preferred embodiment of the present disclosure, the housing structure has at least one recess for the at least one edge region. For example, in the sectional view which runs perpendicular to the pivot axis, the at least one recess is configured to be arcuate and/or sickle-shaped. In particular the at least one recess is formed in the base material of the housing structure.

Preferably the at least one edge region in the third position of the cover is disposed in the at least one recess. In particular, the edge region is moved into the at least one recess during the transfer of the cover from the first or second position into the third position, wherein the at least one edge region in the third position is positioned in the at least one recess. Thus, the complete opening of the cover is made possible without it impacting against the housing structure with the at least one edge region.

In the event that the cover is pivotable to both sides and/or is pivotable about the first and second pivot axis, the cover has a first recess for the first edge region and a second recess for the second edge region. In particular, the first edge region is disposed in the first recess during pivoting of the cover about the first pivot axis and in the third position of the cover. Optionally the second edge region is disposed in the second recess during pivoting of the cover about the second pivot axis and in the third position of the cover.

In a particularly preferred embodiment of the present disclosure, the cover includes at least one cover-side latching magnet. Preferably the at least one cover-side latching magnet is disposed on one of the two cover front sides, in particular in the first cover front side, on the at least one edge region of the cover and therefore is pivotable with this. For example, the at least one cover-side latching magnet is fastened seamlessly to the at least one edge region, for example, is adhesively bonded to this and/or integrated in this, in particular is formed in the base material. Preferably the at least one cover-side latching magnet is configured as at least one neodymium magnet.

In the event that the cover is pivotable on both sides and/or is pivotable about the first and second pivot axis, the cover has a first cover-side latching magnet which is disposed in the first edge region and a second cover-side latching magnet which is disposed in the second latching region.

In a preferred embodiment of the present disclosure, the at least one cover-side latching magnet in the first and in the second position of the cover in a plan view from below is arranged free from overlap, in particular at a distance and/or offset to the at least one structure-side magnet. In particular, in the first and in the second position of the cover, the at least one cover-side latching magnet is disposed free from operative communication to the at least one structure-side magnet. Especially the at least one structure-side magnet and the at least one cover-side latching magnet in the first and second position of the cover neither repel nor attract one another.

Preferably magnetic forces of the at least one cover-side latching magnet in the first position of the cover are aligned horizontally or substantially horizontally to the magnetic forces of the at least one structure-side magnet. Particularly preferably the magnetic forces of the at least one cover-side latching magnet in the second position are aligned at an angle to the magnetic forces of the at least one structure-side magnet, wherein the angle corresponds to that of the pivoting of the cover in the second position. In particular, the alignment of the magnetic forces of the at least one cover-side latching magnet is dependent on the pivot position of the cover. The angle of the pivot position and the alignment of the magnetic forces is preferably selected to be sufficiently small so that magnetic forces in the first and second position of the cover are aligned so that the at least one cover-side latching magnet and the at least one structure-side magnet neither mutually attract nor mutually repel.

In a preferred implementation of the present disclosure, the at least one cover-side latching magnet and the at least one structure-side magnet in the third position of the cover are arranged to be mutually attracting. In particular, the negative pole of the at least one cover-side latching magnet is directed towards the positive pole of the at least one structure-side magnet. Alternatively the positive pole of the at least one cover-side latching magnet is directed towards the negative pole of the at least one structure-side magnet.

It is furthermore preferred that the at least one cover-side latching magnet in the third position is disposed in the direction of the receiving container below the at least one structure-side magnet and in plan view from below overlapping, in particular completely or mostly overlapping with respect to this. Preferably the magnetic forces of the at least one cover-side latching magnet in the third position of the cover are aligned in the opposite direction to the magnetic forces of the structure-side magnet, in particular vertically or substantially vertically to the at least one pivot axis. As a result, the attractive arrangement of both magnets can be implemented. This advantageously has the result that the cover in the third position is magnetically engaged and/or secured. In particular the cover in the third position can also be held open during bumpy travel of the vehicle, where an unintentional closing of the cover can be avoided.

In particular it is provided that during pivoting of the cover the at least one cover-side latching magnet disposed on at least one edge region is pivoted and/or guided around the at least one pivot axis and optionally additionally around the at least one structure-side magnet. As a result, a change in the arrangement of the at least one cover-side latching magnet in relation to the at least one structure-side magnet is advantageously obtained. Furthermore, a change in the alignment of the magnetic forces from the horizontal alignment in the first position to the oppositely directed, in particular perpendicular, especially vertical alignment in the third position.

In the event that the cover is pivotable to both sides and/or is pivotable about the first and second pivot axis, during pivoting of the cover about the first pivot axis and in the third position of the cover, the first cover-side latching magnet and the first structure-side magnet are arranged to be mutually attracting. During pivoting of the cover about the second pivot axis and in the third position of the cover, the second cover-side latching magnet and the second structure-side magnet are preferably arranged to be mutually attracting.

Alternatively or optionally additionally to the at least one structure-side magnet, the housing structure includes at least one further structure-side magnet. Preferably the at least one further structure-side magnet is disposed on one of the two front sides of the housing structure, in particular integrated positively, in particular formed in the base material of the front side. Here it is preferable that it is arranged on the second front side when the at least one structure-side magnet is disposed on the first front side. In particular, the at least one further structure-side magnet is disposed on that front side which lies opposite the front side on which the at least one structure-side magnet is disposed.

In a preferred embodiment of the present disclosure, the at least one further structure-side magnet is arranged in one of the front sides such that it extends in its longitudinal direction axially to the at least one pivot axis. In particular, the at least one further structure-side magnet is arranged in the same direction, in particular parallel, especially congruently in sections with the at least one pivot axis.

Preferably magnetic forces of the at least one further structure-side magnet are aligned axially, in the same direction, parallel, especially congruently in the longitudinal direction to the at least one pivot axis. In particular, the magnetic forces are aligned independently of the pivot position of the cover.

In the event that the cover is pivotable to two sides and/or is pivotable about the first and second pivot axis, the at least one further structure-side magnet includes a third and fourth structure-side magnet, wherein the third structure-side magnet is disposed axially to the first pivot axis and the fourth structure-side magnet is disposed axially to the fourth pivot axis.

It is particularly preferred that the cover alternatively or optionally additionally to the at least one cover-side latching magnet has at least one further cover-side latching magnet. Preferably the at least one further cover-side latching magnet is disposed on one of the two cover front sides, in particular on the second cover front side, in particular is integrated seamlessly therein. For example, the at least one further latching magnet is disposed on an opposite cover front side to that cover front side on which the at least one cover-side latching magnet is disposed.

In a preferred constructive implementation of the present disclosure, the at least one further cover-side latching magnet is disposed in one of the front sides so that it extends in its longitudinal direction axially to the at least one pivot axis. In particular, the at least one further cover-side latching magnet is disposed in the same direction, in particular parallel, especially congruently in sections with the at least one pivot axis. Here it is disposed in particular adjacent to the at least one further structure-side magnet, where both are axially in alignment.

In the event that the cover is pivotable to two sides and/or is pivotable about the first and second pivot axis, the at least one further cover-side latching magnet includes a third and fourth cover-side latching magnet wherein the third cover-side latching magnet is disposed axially to the first pivot axis and the fourth cover-side latching magnet is disposed axially to the fourth pivot axis.

Preferably magnetic forces of the at least one further cover-side latching magnet are aligned axially, in particular in the longitudinal direction of the at least one pivot axis. In particular, the magnetic forces are aligned in the opposite direction to the magnetic forces of the at least one further structure-side magnet.

It is preferred that the at least one further cover-side latching magnet in the first and second position of the cover is arranged free from operative communication or repelling with respect to the at least one further structure-side magnet. This is achieved in particular as a result of the pivot position of the cover and as a result of changing pole position of the at least one further cover-side latching magnet with the pivoting. As a result, a simple transfer of the cover from the first or second position into the third position can be ensured.

It is particularly preferred that the at least one further cover-side latching magnet in the third position of the cover is arranged in operative communication with the at least one further structure-side magnet. Preferably the pole directed towards the at least one further structure-side magnet in the third position of the cover is arranged, aligned and/or pivoted so that both magnets mutually attract. In particular, the at least one further cover-side latching magnet and the at least one further structure-side magnet in the third position are attracting to one another. As a result, the magnetic latching of the cover in the third position can advantageously be achieved or intensified. In particular the cover cannot close unintentionally.

In the case where the cover is pivotable to both sides and/or is pivotable about the first and second pivot axis, the third structure-side magnet and the third cover-side latching magnet in the first and second position of the cover are arranged and/or aligned free from operative communication with one another. Alternatively the aforesaid magnets are repelling to one another. Preferably the fourth structure-side magnet and the fourth cover-side latching magnet in the first and second position of the cover are arranged and/or aligned free from operative communication with one another. Alternatively the aforesaid magnets are repelling to one another. In the third position of the cover it is particularly preferred that the aforesaid pairs of magnets including third and fourth structure-side and cover-side magnets are attracting to one another.

A further subject matter of the present disclosure relates to a vehicle having the storage compartment include the housing structure and cover as further described herein.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
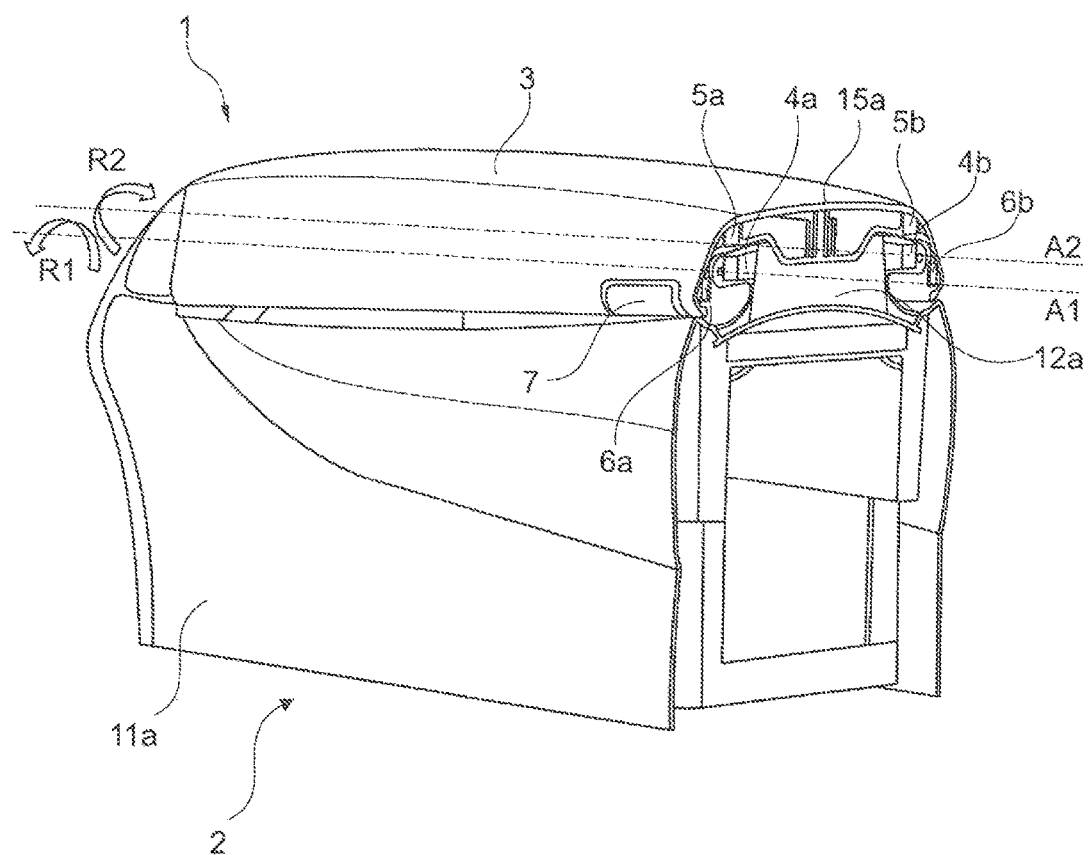
FIG. 1 shows a perspective lateral plan view of a storage compartment for a vehicle having a housing structure and a pivotable cover.

FIG. 1 shows a storage compartment 1 for a vehicle, for example, an automobile or a truck. The storage compartment 1 can be integrated in an interior fitting of the vehicle, for example, in a central console. The storage compartment 1 has a housing structure 2 and a cover 3. The housing structure 2 and the cover 3 are formed of a rigid plastic material as base material. In particular, they are formed as plastic moldings.

Figure 2:
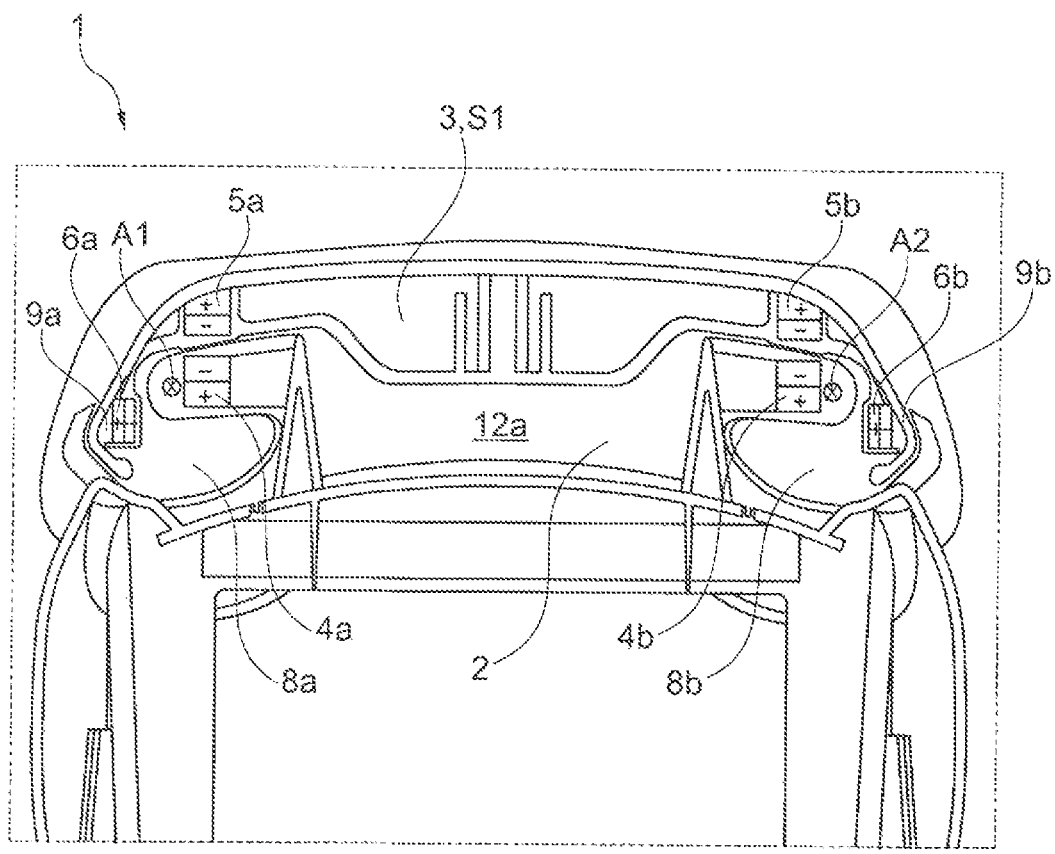
FIG. 2 shows a sectional view of the storage compartment from FIG. 1, where a line of intersection runs perpendicular to a pivot axis of the cover in a first position.

The cover 3 is mounted on the housing structure 2 pivotably about a first pivot axis A1 and about a second pivot axis A2. As a result, the cover 3 can be opened and closed in two different pivot directions R1, R2 (FIG. 2). In particular, the cover 3 can be opened in a direction from a left-side seat of the vehicle or a direction from a right-side seat of the vehicle so that the opening gap 10 thereby formed is directed to the corresponding seat.

The storage compartment 1 has a locking device 7, which is configured for positive locking and/or latching of the cover 3 in the first position S1. The locking device 7 includes at least one latching element and at least one counter-latching element, where the latching element is disposed on the cover 3 and the counter-latching element is disposed on the housing structure 2. In the first position of the cover 3 the latching element engages positively in the counter-latching element whereby the cover 3 is locked. An occupant of the vehicle can unlock and release the cover manually.

The housing structure 2 forms a receiving container in which the passenger can insert and store objects. It includes two opposite front sides 12a, 12b, which are interconnected by a first side surface 11a and a second side surface 11b arranged opposite the first side surface 11a. The cover 3 can be pivoted from a first position S1 into a second position S2 and into a third position S3. In the first position S1 the housing structure 2 is completely closed by the cover 3 as shown in FIGS. 1 and 2.

Figure 3:
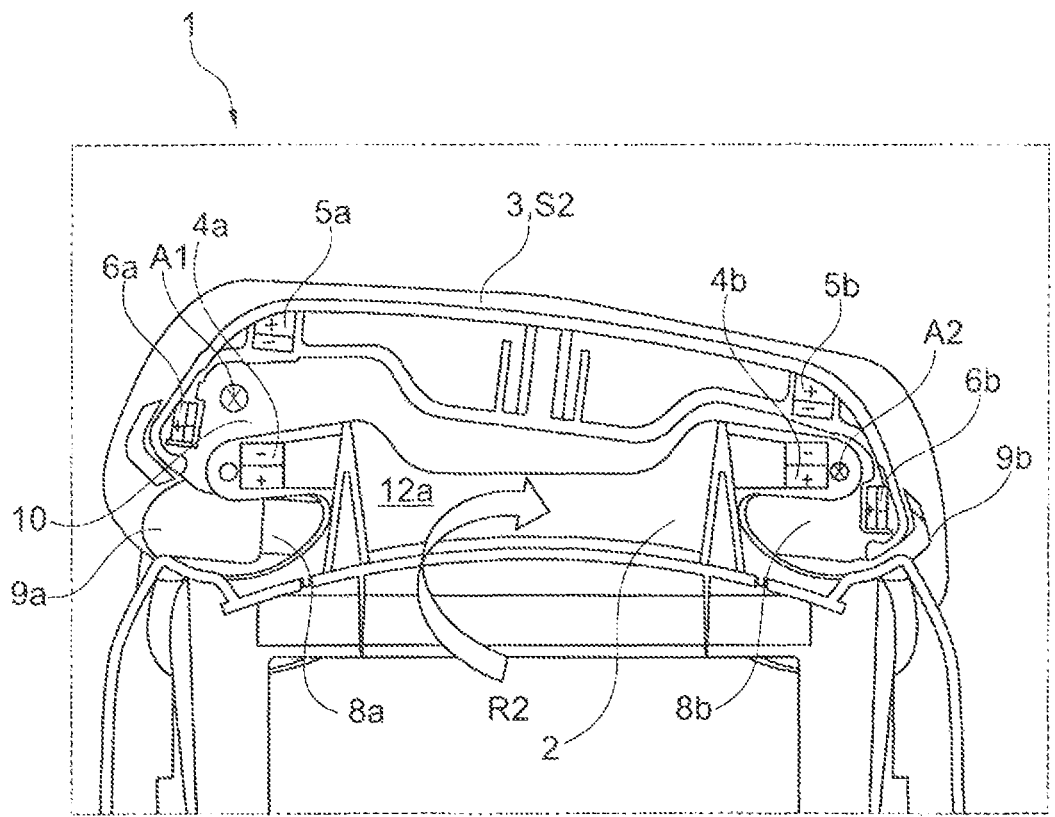
FIG. 3 shows a sectional view of the storage compartment from FIG. 2, where the cover adopts a second position.

In the second position S2 the cover 3 partially reveals the receiving container of the housing structure 2, where the cover where the cover 3 is open by the width of an opening gap 10. The second position 82 is shown in FIG. 3. In the second position S2 the cover 3 is pivoted at an angle of at least 5 degrees, at most 20 degrees, and preferably of at most 15 degrees and especially of at most 10 degrees to the cover in the first position S1 and/or to the pivot axes A1, A2.

Figure 4:
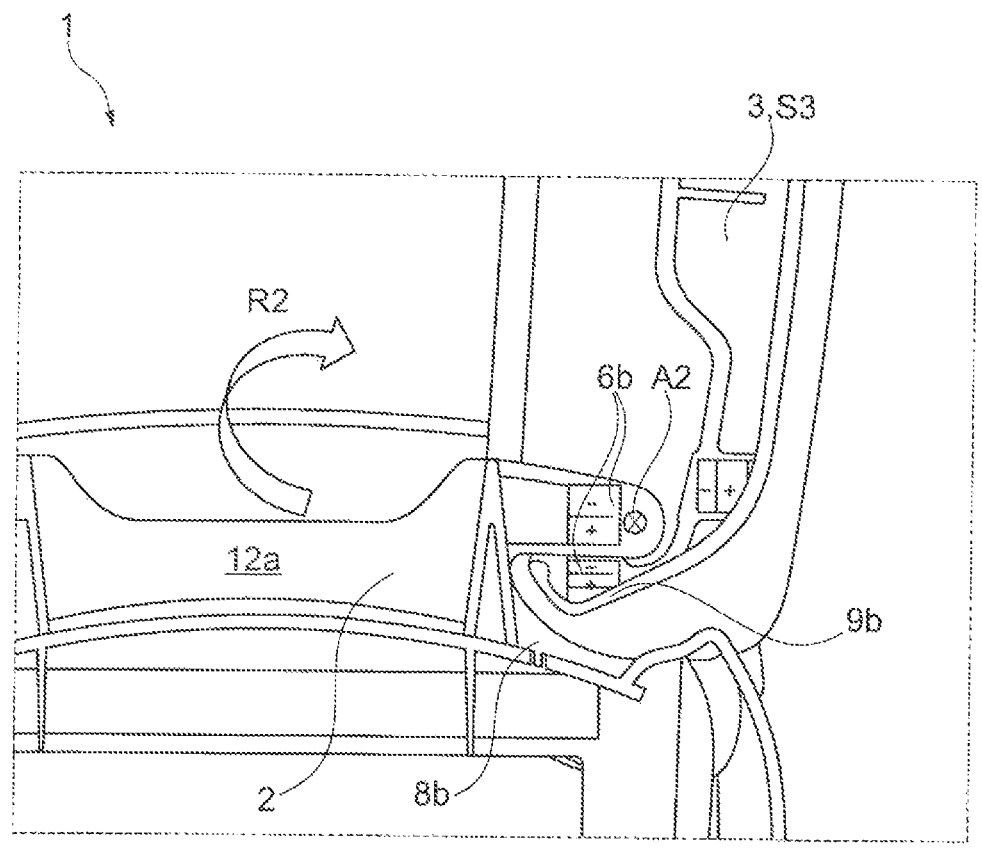
FIG. 4 shows a sectional view of the storage compartment from FIG. 2, where the cover adopts a third position.

In the third position S3 according to FIG. 4, the cover 3 completely reveals the housing structure 2, where the cover 3 is pivoted by at least 75 degrees, preferably by at least 85 degrees and/or at most by 130 degrees with respect to the cover 3 of the first position S1.

The housing structure 2 has a first structure-side magnet 4a and a second structure-side magnet 4b. The structure-side magnets 4a, 4b are integrated in the housing structure 2 as shown in FIGS. 2 to 4. In particular, the base material of the housing structure 2 over molds the two structure-side magnets 4a, 4b such that they are preferably invisible.

According to FIG. 1, the first and second structure-side magnets 4a, 4b are disposed on the first front side 12a. It is possible that the magnets 4a, 4b are configured to be cylindrical and arranged point by point or extend as bar magnets in longitudinal extension along upper edges of the side surfaces 11a, 11b.

The cover 3 has a first and second cover-side damping magnet 5a, 5b and a first and second cover-side latching magnet 6a, 6b. The first and second damping and latching magnets 5a, 5b, 6a, 6b are integrated seamlessly in a first front side 15a of the cover 3 which is assigned to the first front side 12a of the storage compartment 1, in particular are over molded by the base material of the cover 3. They are preferably molded invisibly into the base material.

The first and second damping magnet 5a, 5b and the first and second latching magnet 6a, 6b are arranged on the front side, in each case at the same height oppositely on the cover 3. The first damping magnet 5a and the first latching magnet 6a are assigned to the first structure-side magnet 4a. The second damping magnet 5b and the second latching magnet 6a are assigned to the second structure-side magnet 4b. It is possible that the aforesaid magnets 5a, 5b, 6a, 6b are, for example, configured to be cylindrical or extend partially in longitudinal extension of the cover 3. In addition, the same arrangement of the magnets 4a, 4b, 5a, 5b, and 6a, 6b described here on the second front side 12b is preferred.

All the aforesaid magnets 4a, 4b, 5a, 5b, 6a, 6b may be configured as so-called neodymium magnets with the property of being extremely strong permanent magnets. They have magnetic forces, which extend along a straight line and are aligned according to this, where the light extends in longitudinal extension from a north pole to a south pole of the magnet.

FIG. 2 shows the storage compartment 1 in a sectional view, there the line of intersection runs perpendicular to the pivot axes A1, A2. The first structure-side magnet 4a is disposed at the height of the first pivot axis A1 and adjacent to this in the housing structure 2. The second structure-side magnet 4b is disposed at the height of the second pivot axis A2 and adjacent to this in the housing structure 2. The magnetic forces of the structure-side magnets 4a, 4b are aligned independently of the position S1, S2, S3 of the cover 3 perpendicularly, substantially perpendicularly, in particular vertically.

The cover 3 is located in the first position S1 and completely closes the housing structure 2. The two cover-side damping magnets 5a. 5b are located above the structure-side magnets 4a, 4b and in a plan view from above, overlapping with these. The magnetic forces of the cover-side damping magnet 5a, 5b in the first position S1 of the cover 3 are aligned in the opposite direction to the magnetic forces of the structure-side magnets 4a, 4b, in particular perpendicular. As a result of the overlapping arrangement from above and the oppositely directed alignment of the magnetic forces of the structure-side and cover-side damping magnets 4a, 4b, 5a, 5b, these are in operative communication in pairs. The poles of the pairs of magnets 4a, 5a and 4b, 5b are arranged and/or aligned so that the structure-side magnets 4a, 4b and the cover-side damping magnets 5a, 5b mutually repel.

As a result of the repelling arrangement and/or alignment of the structure-side and cover-side magnets 4a, 4b, 5a, 5b, a play-free arrangement of the cover 3 in the first position S1 and in particular in relation to the positive locking by the locking device 7 (FIG. 1) can be ensured. It can thus be prevented that the cover 3 is set to vibrate and causes flapping noises in particular during travel of the vehicle.

The housing structure 2 has a first and second recess 8a, 8b for a first and second edge region 9a, 9b of the cover 3. During transfer of the cover 3 from the first position S1 into the second position S2 and in particular into the third position S3 according to FIGS. 3 and 4, the cover 3 pivots according to the choice of pivot axes A1, A2 with the first or with the second edge region 9a, 9b into the corresponding first or second recess 8a, 8b.

As shown in FIG. 4, after complete pivoting of the cover 3 about the second pivot axis A2, in particular in the third position S3 of the cover 3, the second edge region 9b is disposed in the second recess 8b. The same applies for a pivoting of the cover 3 about the first pivot axis A1.

The two cover-side latching magnets 6a, 6b are disposed on the edge regions 9a, 9b, in particular integrated in these. During pivoting of the cover 3 about the pivot axis A1 or A2, the corresponding cover-side latching magnet 6a, 6b together with the corresponding edge region 9a, 9b is pivoted into the first or second recess 8a, 8b provided for this purpose and positioned therein.

The cover-side latching magnets 6a, 6b are thus integrated in the edge regions 9a, 9b so that the magnetic forces thereof in the first position S1 of the cover according to FIG. 2 are aligned horizontally to the magnetic forces of the structure-side magnets 4a, 4b. In a plan view from below, the two cover-side latching magnets 6a, 6b are arranged free from overlap, in particular spaced apart and offset with respect to the structure-side magnets 4a, 4b. As a result, they are arranged free from operative communication to the structure-side magnets 4a, 4b. In particular, the cover-side latching magnets 6a, 6b and the structure-side magnets 4a, 4b in the first position S1 of the cover 3 neither attract nor mutually repel.

FIG. 3 shows a sectional view of the storage compartment 1 from FIG. 2, where the cover 3 adopts the second position S2. The cover 3 is partially pivoted about the second pivot axis A2. If desired however, it could also be pivoted about the first pivot axis A1. The second edge region 9b of the cover 3 is pivoted a little way into the second recess 8b. At the same time, the first edge region 9a is arranged at a distance from the first side surface 11a so that the opening gap 10 between the cover 3 and the first side surface 11a is formed.

The magnetic forces of the cover-side damping magnets 5a, 5 in the second position S2 of the cover 3 as a result of the partial pivoting of the cover 3 about the second pivot axis A2 are aligned at an angle to the magnetic forces of the structure-side magnets 4a, 4b where the angle is at least 5 degrees and/or at most 20 degrees, preferably at most 15 degrees and especially at most 10 degrees. In particular, the magnetic forces are pivoted by an angle, about the angle the cover 3 is pivoted in the second position S2.

In the second position S2 of the cover 3, in the plan view from above, the first cover-side damping magnet 5a and the second cover-side damping magnet 5b are arranged partially overlapping with the corresponding structure-side magnets 4a, 4b. As a result the aforesaid magnets 4a, 5a, 4b, 5b are in operative communication, where the magnets 4a, 4b, 5a, 5b of both pairs of magnets are mutually repelling with respect to one another as already in the first position S1 of the cover 3. As a result, the partial opening in the second position S2 of the cover 3 is assisted so that the cover 3 is held open and the opening gap 10 is reliably maintained. It is thereby achieved that after opening by the passenger, the cover 3 does not automatically close unintentionally.

The cover-side latching magnets 6a, 6b in the second position S2 of the cover 3 are disposed and/or aligned so that their magnetic forces are aligned as a result of the partial pivoting of the cover 3 at an angle of at least 5 degrees and/or at most 20 degrees, preferably of at most 15 degrees and especially of at most 10 degrees to the magnetic forces of the structure-side magnets 4a, 4b. In particular, the magnetic forces are pivoted by an angle, about the angle the cover 3 is pivoted in the second position S2.

The cover-side latching magnets 6a, 6b in the second position S2 in the plan view from below are arranged free from overlap, in particular at a distance and offset to the structure-side magnets 4a, 4b. As a result, they are in no operative communication with the structure-side magnets 4a, 4b. In particular, the cover-side latching magnets 6a, 6b and the corresponding structure-side magnets 4a, 4b in the second position S2 of the cover 3 neither mutually attract nor repel.

FIG. 4 shows the sectional view through the storage compartment 1 from FIGS. 2 and 3 where the cover 3 is disposed in the third position S1 The cover 3 completely reveals the housing structure 2 so that the passenger can grip into the receiving compartment. The cover 3 in the position S3 is pivoted about the pivot axis A2. If desired, however, it could also be pivoted about the first pivot axis A1.

The second edge region 9b of the cover is pivoted together with the cover-side latching magnets 6b arranged thereon into the second recess 8b of the housing structure 2. As a result of the pivoting, the cover-side latching magnet 6b is disposed underneath and in the plan view from below, overlapping with the second structure-side magnet 4b and is thereby in operative communication with this. The magnetic forces of the second cover-side latching magnet 6b in the third position S3 of the cover 3 are aligned in the opposite direction to the magnetic forces of the second structure-side magnet 6b, in particular perpendicularly, especially vertically. The poles of the second cover-side latching magnet 6b and the second structure-side magnet 4b are in this case disposed and/or aligned so that they mutually attract. As a result, a magnetic latching of the cover 3 in the third position S3 is achieved. In particular, it is ensured that the cover 3 is held securely in the third position S3 and cannot pivot back unintentionally into the second position S2.

As a result of the pivoting of the cover 3 into the third position S3, the first and second cover-side damping magnet 5a, 5b in the plan view from above are disposed free from overlap, in particular offset and/or at a distance and with respect to the corresponding structure-side magnets 4a, 4b.

As a result of the pivoting of the cover 3 into the third position S3, the magnetic forces of the cover-side damping magnets 5a, 5b are aligned horizontally to the magnetic forces of the structure-side magnets 4a, 4b. As a result of the arrangement of the cover-side damping magnets 5a, 5b and the alignment of the magnetic forces, there is no operative communication between the cover-side magnets 5a, 5b and the structure-side magnets 4a, 4b. As a result, the structure-side magnets 4a, 4b and the cover-side damping magnets 5a, 5b do not mutually attract and also do not mutually repel.

Figure 5:
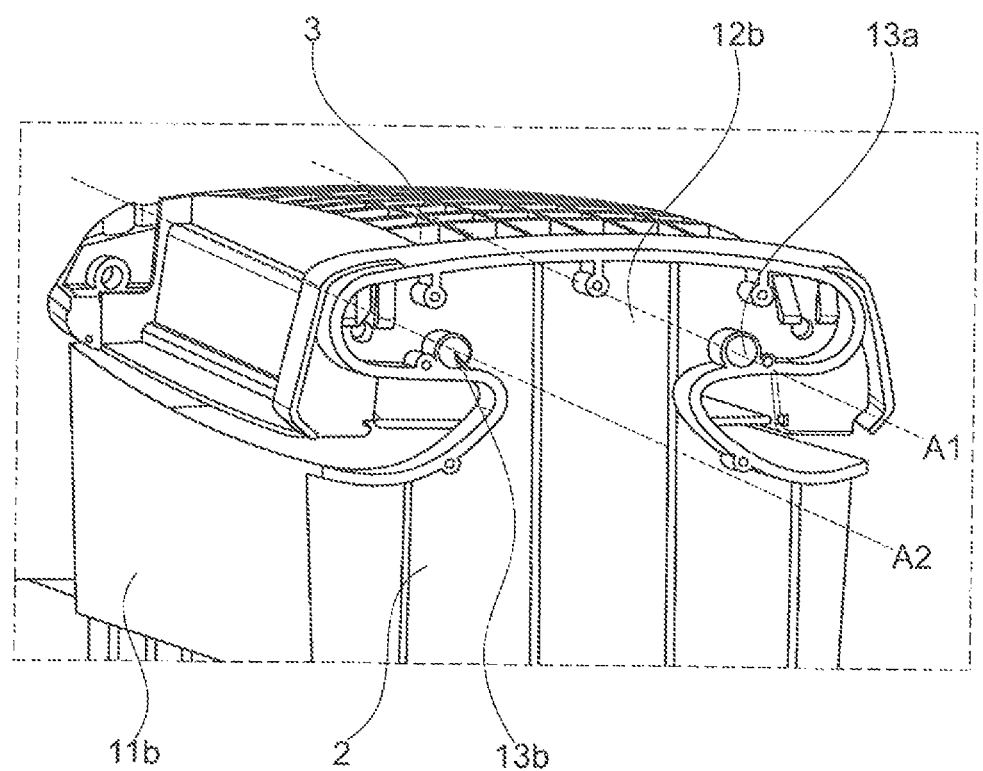
FIG. 5 shows a further perspective plan view of the second front side of the storage compartment from FIG. 1.

FIG. 5 shows a perspective plan view of the second front side 12b of the storage compartment 1 where the cover 3 adopts the first position S1. The housing structure 2 has a third and fourth structure-side magnet 13a, 13b. The third and fourth structure-side magnet 13a, 13b are disposed on the second front side 12b of the storage compartment 1, in particular integrated positively therein. They are configured as cylindrical magnets. Alternatively, they can also be configured as bar magnets.

The third structure-side magnet 13a extends axially, in particular in the same direction and/or parallel, especially congruently in sections to the first pivot axis A1 and the fourth structure-side magnet 13b to the second pivot axis A2. Magnetic forces of the third structure-side magnets 13a are aligned axially, in particular in the same direction as the first pivot axis A1. The magnetic forces of the fourth structure-side magnet 13b are also aligned axially, in particular in the same direction to the second pivot axis A2. In particular, the magnetic forces are aligned independently of the pivot position of the cover.

Figure 6:
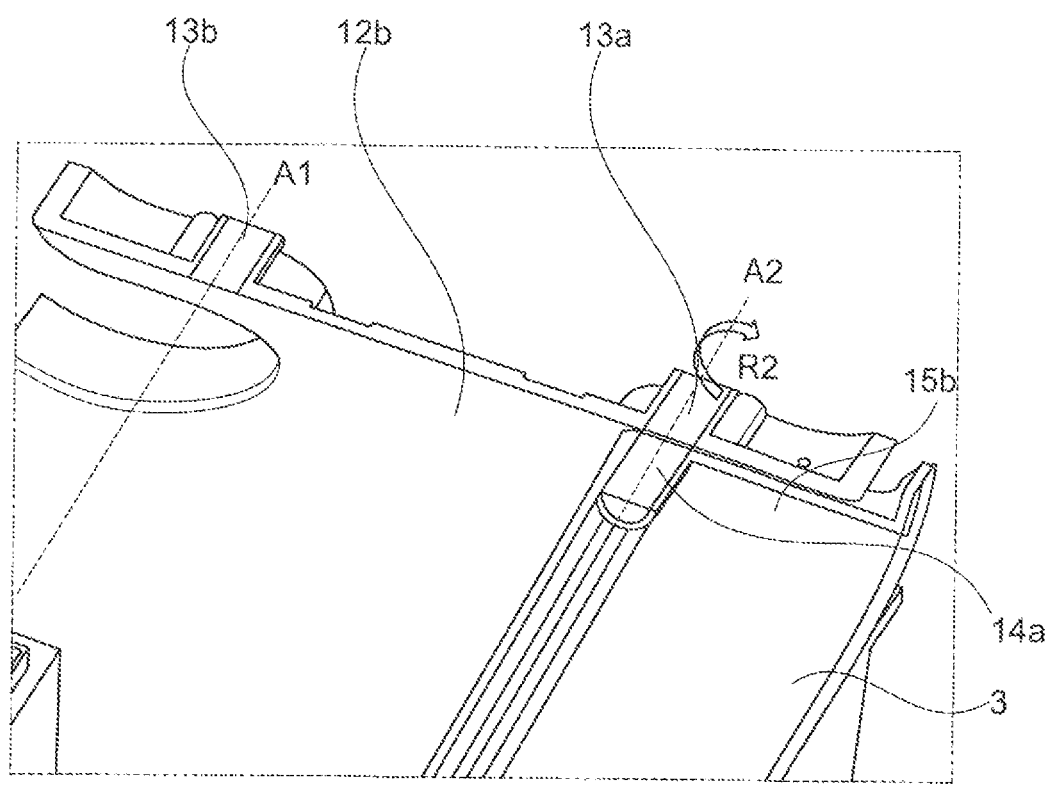
FIG. 6 shows a plan view from above of the second front side from g. 5 with the cover in the third position.

FIG. 6 shows a plan view from above of the second front side 12b of the storage compartment 1 and of the second front side 15b of the cover 3. The cover 3 is located in the third position S3. The cover 3 has a third cover-side latching magnet 14a and a fourth cover-side latching magnet 14b (not shown). The third and fourth cover-side latching magnets 14a, 14b are disposed on a second front side 15b facing and/or assigned to the second front side 12b of the storage compartment 1, in particular are integrated seamlessly therein. In this case, the third cover-side latching magnet 14a is disposed adjacent to the third structure-side magnet 13a and the fourth cover-side latching magnet 14b is disposed adjacent to the fourth structure-side magnet 13b. In particular the two pairs of magnets 13a, 14a, 13b, 14b are aligned in their longitudinal extension.

The third cover-side latching magnet 14a is configured to be cylindrical and runs axially, preferably in the same direction, in particular parallel, especially congruently in sections with the first pivot axis A1. In this case, it visually continues the third structure-side magnet 13a in its longitudinal extension. The fourth cover-side latching magnet 14b is configured to be cylindrical and runs axially, preferably in the same direction, in particular parallel, especially in sections congruently with the second pivot axis A2, where it visually continues the fourth structure-side magnet 13b in its longitudinal extension.

The magnetic forces of the third cover-side latching magnet 14a are axially aligned, in particular aligned in the same direction to the first pivot axis A1. In particular, the magnetic forces are in the opposite direction to the magnetic forces of the third structure-side magnet 13a. The magnetic forces of the fourth cover-side latching magnet 14b are axially aligned, in particular aligned in the same direction to the second pivot axis A2. In particular, the magnetic forces are in the opposite direction to the magnetic forces of the fourth structure-side magnet 13b.

The third cover-side latching magnet 14a in the first and second position S1, S2 of the cover 3 is disposed free from operative communication or mutually repelling to the third structure-side magnet 13a. The fourth cover-side latching magnet 14b in the first and second position S1, S2 of the cover 3 is disposed free from operative communication or repelling to the fourth structure-side magnet 13b. It is thereby achieved that the cover 3 can be transferred into the third position S3.

In the third position S3 of the cover 3, the aforesaid pairs of magnets 13a, 14a, 13b, 14b are in operative communication. In this case, the third and fourth cover-side latching magnet 14a, 14b are pivoted as a result of the pivot position of the cover 3 so that they are mutually attracting to the third and fourth structure-side magnets 13a, 13b. This brings about a magnetic latching of the cover 3 in the third position S3 so that this cannot unintentionally close.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A storage compartment for a vehicle comprising:
    a housing structure forming a compartment;
    a cover pivotally mounted about at least one pivot axis, the cover is pivotable from a first position that completely closes the compartment to a second position that partially reveals the compartment and further to a third position that completely reveals the compartment; and
    at least one magnet pair including a first magnet mounted in the housing structure and a second magnet mounted in the cover, wherein the at least one magnet pair is arranged in a mutually repelling manner when the cover is in either the first position or the second position.

2. The storage compartment according to claim 1, wherein the first magnet is disposed at or adjacent to a height of the at least one pivot axis.

3. The storage compartment according to claim 1, wherein a magnetic force of the at least one magnet pair is aligned perpendicularly to the at least one pivot axis.

4. The storage compartment according to claim 1, wherein the second magnet is disposed above and overlapping with said the first magnet in a plan view from above when the cover is in either the first or second position.

5. The storage compartment according to claim 1, wherein a magnetic force of the second magnet is directed opposite to the magnetic forces of the first magnet when the cover is in the first position.

6. The storage compartment according to claim 1, wherein in a plan view from above, the second magnet is disposed free from overlap and free from operative communication with the first magnet when the cover is in the third position.

7. The storage compartment according to claim 6, wherein magnetic forces of the second magnet are aligned perpendicularly to the magnetic forces of the first magnet when the cover is in the third position.

8. The storage compartment according to claim 1, wherein the housing structure comprises at least one recess configured to at least partially receive an edge region of the cover when the cover is in the third position.

9. The storage compartment according to claim 8, further comprising a third magnet mounted in the edge region of the cover and pivotable jointly with the cover about the at least one pivot axis.

10. The storage compartment according to claim 9, wherein in a plan view from below, the third magnet is positioned in a non-overlapping arrangement and free from operative communication with the first magnet when the cover is in either the first or second position.

11. The storage compartment according to claim 10, wherein magnetic forces of the third magnet are aligned with the magnetic forces of the first magnet for mutual attraction when the cover is in the third position.

12. The storage compartment according to claim 9, wherein the first magnet and the third magnet are arranged in a mutually attracting manner when the cover is in the third position.

13. The storage compartment according to claim 9, wherein the third magnet is disposed underneath and overlapping the first magnet in a plan view when the cover is in the third position.

* * * * *